US012046092B2

(12) United States Patent
Matsuo et al.

(10) Patent No.: US 12,046,092 B2
(45) Date of Patent: Jul. 23, 2024

(54) GATE PASS MANAGEMENT SYSTEM, GATE PASS MANAGEMENT METHOD, MOBILE DEVICE, GATE PASS NOTIFICATION METHOD, AND PROGRAM

(71) Applicant: PANASONIC INTELLECTUAL PROPERTY MANAGEMENT CO., LTD., Osaka (JP)

(72) Inventors: Nobuo Matsuo, Hyogo (JP); Yanfeng Wang, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 538 days.

(21) Appl. No.: 17/279,911

(22) PCT Filed: Jul. 3, 2019

(86) PCT No.: PCT/JP2019/026524
§ 371 (c)(1),
(2) Date: Mar. 25, 2021

(87) PCT Pub. No.: WO2020/066202
PCT Pub. Date: Apr. 2, 2020

(65) Prior Publication Data

US 2021/0398374 A1 Dec. 23, 2021

(30) Foreign Application Priority Data

Sep. 28, 2018 (JP) ................................ 2018-186017

(51) Int. Cl.
*G07C 9/27* (2020.01)
*G07C 9/00* (2020.01)
(Continued)

(52) U.S. Cl.
CPC ........... *G07C 9/10* (2020.01); *G07C 9/00309* (2013.01); *G07C 9/27* (2020.01); *G07C 9/28* (2020.01);
(Continued)

(58) Field of Classification Search
CPC ...... H04W 12/06; H04W 88/02; G07C 5/008; G07C 9/00309; G07C 5/0808; G07C 9/00;
(Continued)

(56) References Cited

U.S. PATENT DOCUMENTS

2005/0046584 A1* 3/2005 Breed .................. G01S 7/4802 340/13.31
2006/0219776 A1* 10/2006 Finn .................... G06K 7/0043 235/380
(Continued)

FOREIGN PATENT DOCUMENTS

JP 2006-236183 A 9/2006
JP 2008-217496 A 9/2008
(Continued)

OTHER PUBLICATIONS

International Search Report and Written Opinion issued in International Patent Application No. PCT/JP2019/026524, dated Sep. 24, 2019; with partial English translation.

*Primary Examiner* — Daniel St Cyr
(74) *Attorney, Agent, or Firm* — Rimon P.C.

(57) ABSTRACT

In a gate pass management system, a first reception unit having a first reception range receives a first RF signal including identification information of a mobile device. In the gate pass management system, a second reception unit having a second reception range, defined to be a range located closer to a predetermined area than the first reception range is, receives a second RF signal. In the gate pass
(Continued)

management system, when the second RF signal is received after the first RF signal has been received, a decision is made that the mobile device be currently located within the second reception range.

12 Claims, 6 Drawing Sheets

(51) Int. Cl.
*G07C 9/10* (2020.01)
*G07C 9/28* (2020.01)

(52) U.S. Cl.
CPC .............. *G07C 2009/00341* (2013.01); *G07C 2009/00801* (2013.01); *G07C 2209/64* (2013.01)

(58) Field of Classification Search
CPC ... G07C 9/10; G07C 9/27; G07C 9/28; G06K 7/10425; G06K 7/10306; G06K 7/10316
USPC ............................................................ 235/93
See application file for complete search history.

(56) References Cited

U.S. PATENT DOCUMENTS

| | | | | |
|---|---|---|---|---|
| 2009/0179742 | A1 | 7/2009 | Takeshima et al. | |
| 2013/0181867 | A1* | 7/2013 | Sturdivant | G06Q 30/0241 342/368 |
| 2015/0065052 | A1* | 3/2015 | Heo | H04M 1/72412 455/41.2 |
| 2015/0268742 | A1* | 9/2015 | Park | H04B 5/0031 345/179 |
| 2017/0201363 | A1* | 7/2017 | Son | H04B 7/0639 |
| 2018/0013211 | A1* | 1/2018 | Ricci | G05B 15/02 |
| 2021/0005036 | A1* | 1/2021 | Johnson | E05B 47/0012 |

FOREIGN PATENT DOCUMENTS

| | | | |
|---|---|---|---|
| JP | 2010-126898 | A | 6/2010 |
| JP | 2014-214572 | A | 11/2014 |
| JP | 2014-218792 | A | 11/2014 |
| JP | 2014-230062 | A | 12/2014 |
| JP | 2015-227594 | A | 12/2015 |
| WO | 2014/109033 | A1 | 7/2014 |

* cited by examiner

GATE PASS MANAGEMENT SYSTEM, GATE PASS MANAGEMENT METHOD, MOBILE DEVICE, GATE PASS NOTIFICATION METHOD, AND PROGRAM

CROSS-REFERENCE OF RELATED APPLICATIONS

This application is the U.S. National Phase under 35 U.S.C. § 371 of International Patent Application No. PCT/JP2019/026524, filed on Jul. 3, 2019, which in turn claims the benefit of Japanese Application No. 2018-186017, filed on Sep. 28, 2018, the entire disclosures of which Applications are incorporated by reference herein.

TECHNICAL FIELD

The present disclosure generally relates to a gate pass management system, a gate pass management method, a mobile device, a gate pass notification method, and a program. More particularly, the present disclosure relates to a gate pass management system, a gate pass management method, a mobile device, a gate pass notification method, and a program, all of which are configured or designed to manage a person's entry into a predetermined area.

BACKGROUND ART

Patent Literature 1 discloses an entry/exit management system. According to Patent Literature 1, authentication is performed using, in combination, a gate pass control means for controlling a visitor's or passenger's pass through an entrance/exit (gate) with an electric means such as an automatic door or an electronic lock, an ID card that stores personal identification information, and an RF ID reader provided near the door. In addition, the entry/exit management system also uses a means for recognizing the visitor/passenger (hereinafter referred to as the "person") based on an image of the person, which has been shot with a camera installed above the door, to monitor the surroundings of the entrance/exit and for tracking, on a virtual space coordinate system, the movement of a symbol representing the person.

In the entry/exit management system (gate pass management system) of Patent Literature 1, the person (via a mobile device that he or she carries with him or her) who is accessing an area around the entrance/exit (a predetermined area) is identified through image processing. However, such image processing involves complicated processing.

CITATION LIST

Patent Literature

Patent Literature 1: JP 2006-236183 A

SUMMARY OF INVENTION

The problem is to provide a gate pass management system, a gate pass management method, a mobile device, a gate pass notification method, and a program, all of which are configured or designed to easily identify a mobile device that is going to access a predetermined area.

A gate pass management system according to an aspect of the present disclosure includes a first reception unit, a second reception unit, and a decision unit. The first reception unit has a first reception range and receives a first RF signal including identification information of a mobile device. The second reception unit has a second reception range and receives a second RF signal. The second reception range is defined to be a range located closer to a predetermined area than the first reception range is. The decision unit decides, when the second reception unit receives the second RF signal after the first reception unit has received the first RF signal, that the mobile device, of which the identification information is included in the first RF signal, be currently located within the second reception range.

A gate pass management method according to another aspect of the present disclosure includes: receiving, at a first reception unit having a first reception range, a first RF signal including identification information of a mobile device; and receiving a second RF signal at a second reception unit having a second reception range. The second reception range is defined to be a range located closer to a predetermined area than the first reception range is. The gate pass management method further includes deciding, when the second reception unit receives the second RF signal after the first reception unit has received the first RF signal, that the mobile device, of which the identification information is included in the first RF signal, be currently located within the second reception range.

A mobile device according to still another aspect of the present disclosure includes a first transmission unit and a second transmission unit. The first transmission unit transmits a first RF signal. The first RF signal is receivable at a first reception unit having a first reception range and includes identification information of a mobile device. The second transmission unit transmits a second RF signal after the first RF signal has been received at the first reception unit. The second RF signal is receivable at a second reception unit having a second reception range which is defined to be a range located closer to a predetermined area than the first reception range is.

A gate pass notification method according to yet another aspect of the present disclosure includes: transmitting a first RF signal which is receivable at a first reception unit having a first reception range and which includes identification information of a mobile device. The gate pass notification method further includes transmitting a second RF signal after the first RF signal has been received at the first reception unit. The second RF signal is receivable at a second reception unit having a second reception range which is defined to be a range located closer to a predetermined area than the first reception range is.

A program according to yet another aspect of the present disclosure is designed to cause one or more processors to perform either the gate pass management method or the gate pass notification method.

DESCRIPTION OF EMBODIMENTS

1. Embodiment 1.1 Overview

Figure 1:
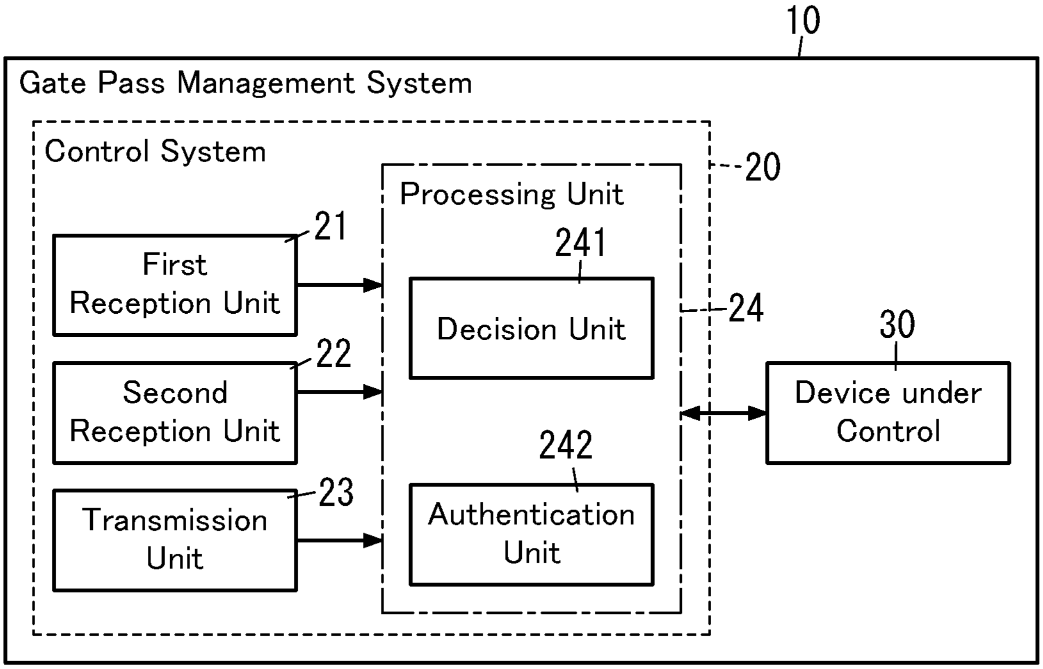
FIG. 1 is a block diagram of a gate pass management system according to an exemplary embodiment.
Figure 2:
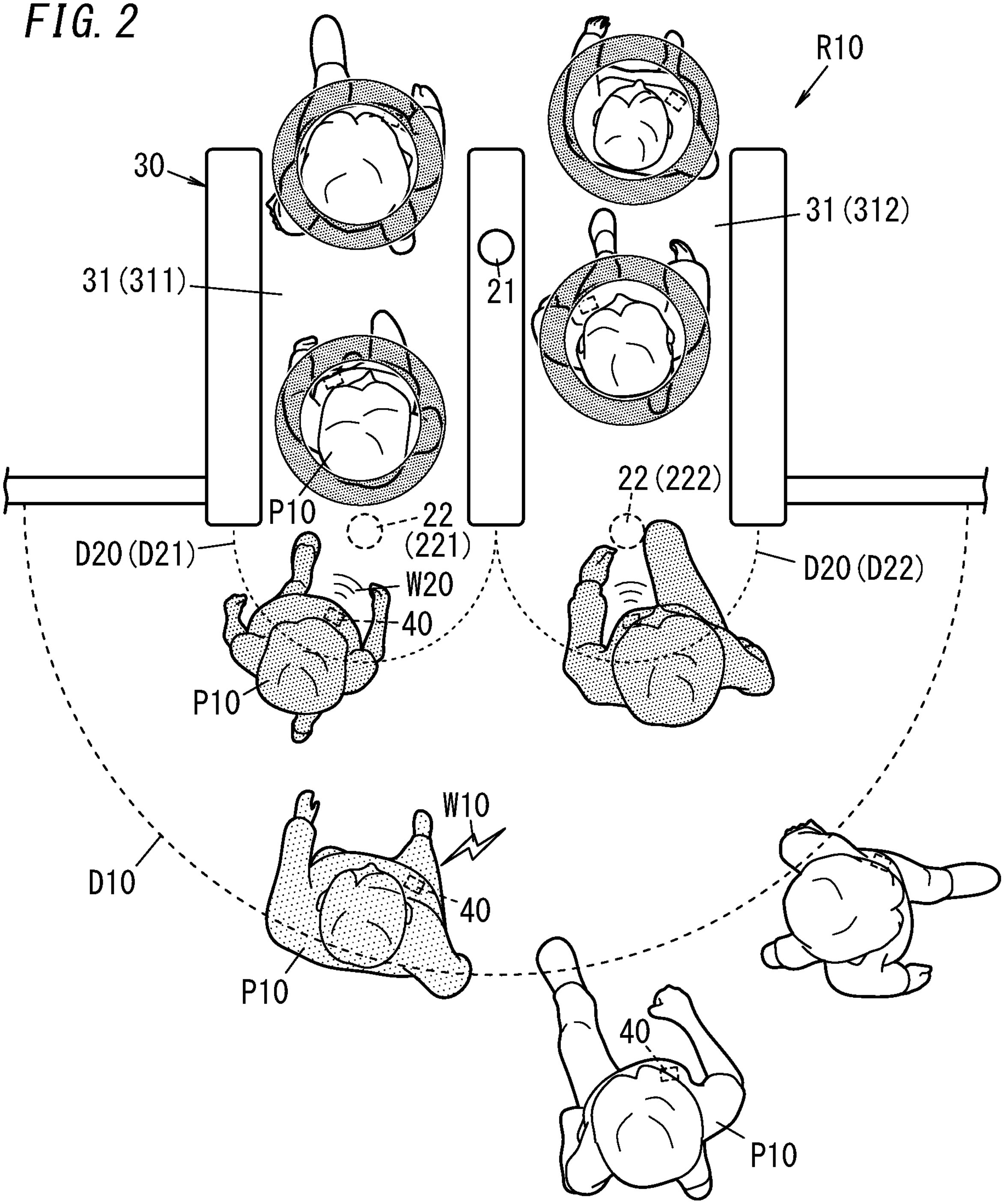
FIG. 2 is a schematic representation of the gate pass management system.

FIG. 1 is a block diagram of a gate pass management system 10 according to an exemplary embodiment of the present disclosure. The gate pass management system 10 includes a first reception unit 21, a second reception unit 22, and a decision unit 241. The first reception unit 21 has a first reception range D10 as shown in FIG. 2 and receives a first RF signal W10 including identification information of a mobile device 40. The second reception unit 22 has a second reception range D20 and receives a second RF signal W20. The second reception range D20 is defined to be a range located closer to a predetermined area R10 than the first reception range D10 is. The decision unit 241 decides, when the second reception unit 22 receives the second RF signal W20 after the first reception unit 21 has received the first RF signal W10, that the mobile device 40, of which the identification information is included in the first RF signal W10, be currently located within the second reception range D20.

In the gate pass management system 10, in the first reception range D10 which is more distant from the predetermined area R10 than the second reception range D20 is, the first RF signal is received to acquire identification information of the mobile device 40. In this case, it is when the mobile device 40 enters the second reception range D20 from the first reception range D10 that the second RF signal is received in the second reception range D20. As can be seen, this gate pass management system 10 may identify the mobile device 40 that is going to access the predetermined area R10 by determining whether or not any RF signal has been received, which is relatively simple processing. This allows the gate pass management system 10 to easily identify the mobile device 40 that is going to access the predetermined area R10.

1.2 Details

Next, the gate pass management system 10 and the mobile device 40 will now be described in further detail. The gate pass management system 10 and the mobile device 40 together form a system that permits or prohibits a person P10 who is carrying the mobile device 40 with him or her to enter, or from entering, the predetermined area R10.

1.2.1 Gate Pass Management System

The gate pass management system 10 includes a control system 20 and a device under control 30 as shown in FIG. 1.

The device under control 30 is a device to be controlled by the control system 20. The device under control 30 is provided for the predetermined area R10. In this embodiment, the device under control 30 is a gate device for restricting a person's entry into the predetermined area R10. As shown in FIG. 2, the device under control 30 is provided in the vicinity of a boundary of the predetermined area R10. As shown in FIG. 2, the device under control 30 includes a plurality of (e.g., two in the example illustrated in FIG. 2) gates 31 (311, 312). The device under control 30 has the functions of opening and closing the gates 31 and sounding an alarm. Such a gate device is typically installed at ticket gate in a railway station, an entrance door of an office building, and various other places that only an authorized person with a gate pass is permitted to enter.

As shown in FIG. 1, the control system 20 includes the first reception unit 21, the second reception unit 22, a transmission unit 23, and a processing unit 24.

The first reception unit 21 is a device for receiving an RF signal. The first reception unit 21 has the first reception range D10 as shown in FIG. 2. The first reception range D10 is provided to detect the mobile device's 40 access to the predetermined area R10. The first reception unit 21 receives a first RF signal W10 (see FIG. 2) including identification information of the mobile device 40. In this embodiment, the medium to propagate the first RF signal W10 is a radio wave. In particular, the medium to propagate the first RF signal W10 is a radio wave compatible with short-range wireless communication. Examples of the short-range wireless communication include Bluetooth® (e.g., Bluetooth Low Energy (BLE), among other things). The first reception unit 21 may include an antenna and a receiver circuit. The first reception unit 21 is arranged to be able to receive the first RF signal W10 from the mobile device 40 that is moving from outside of the predetermined area R10 toward the inside of the predetermined area R10. In FIG. 2, the first reception unit 21 is installed in the device under control 30.

The second reception unit 22 is a device for receiving an RF signal. The second reception unit 22 has the second reception range D20 as shown in FIG. 2. The second reception range D20 is defined to be a range located closer to the predetermined area than the first reception range D10 is. As used herein, the "range located closer to the predetermined area R10 than the first reception range D10 is" may be regarded as a range having a boundary, inside which an RF signal is receivable and which is located closer to the predetermined area R10 than the first reception range D10 is. That is to say, the first reception range D10 and the second reception range D20 may be defined to allow the first reception unit 21 to receive the first RF signal W10 from the mobile device 40 before the mobile device 40 enters the second reception range D20. In this embodiment, the first reception range D10 includes the second reception range D20 in its entirety. Thus, even in the second reception range D20, the first reception unit 21 may also receive the first RF signal W10. However, the first reception range D10 does not have to include the second reception range D20. In other words, the first reception unit 21 does not have to receive the first RF signal W10 in the second reception range D20.

The second reception unit 22 receives the second RF signal W20. The medium to propagate the second RF signal W20 is different from the medium to propagate the first RF signal W10. In this embodiment, the medium to propagate the first RF signal W10 is a radio wave. Thus, the medium to propagate the second RF signal W20 is a wireless medium other than the radio wave. In particular, the medium to propagate the second RF signal W20 is a sound wave. In this embodiment, the medium to propagate the second RF signal W20 is an ultrasonic wave. The second reception unit 22 may include an ultrasonic sensor and a demodulator circuit. The second reception unit 22 is arranged to be able to receive the second RF signal W20 from the mobile device 40 that is moving from outside of the predetermined area R10 toward the inside of the predetermined area R10. In FIG. 2, the second reception unit 22 is installed in the device under control 30. In particular, in this embodiment, the control system 20 includes a plurality of (e.g., two in the example illustrated in FIG. 2) second reception units 22 (221, 222) as shown in FIG. 2. The two second reception units 221, 222 are respectively provided for the gates 311, 312 of the device under control 30. More specifically, the second reception range D20 (D21) of the second reception unit 221 is located in front of the gate 311, and the second reception range D20 (D22) of the second reception unit 222 is located in front of the gate 312.

The transmission unit 23 is a device for transmitting an RF signal. The transmission unit 23 is provided to transmit an RF signal (third RF signal) from the gate pass management system 10 to the mobile device 40 that is going to access the predetermined area R10. The transmission unit 23 has a transmission range which is broader than the second reception range D20. That is to say, the transmission range is defined to allow the mobile device 40 to receive the third RF signal from the gate pass management system 10 before the mobile device 40 enters the second reception range D20. In this embodiment, the transmission range of the transmission unit 23 is as broad as the first reception range D10. However, the transmission range has only to be broader than the second reception range D20 but as broad as, or narrower than, the first reception range D10. In this embodiment, the medium to propagate the third RF signal is a radio wave. In particular, the medium to propagate the third RF signal is a radio wave compatible with short-range wireless communication. Examples of the short-range wireless communication include Bluetooth® (e.g., Bluetooth Low Energy (BLE), among other things). The transmission unit 23 may include an antenna and a transmitter circuit. The transmission unit 23 is arranged to allow the mobile device 40 that is moving from outside of the predetermined area R10 toward the inside of the predetermined area R10 to receive the third RF signal. The transmission unit 23 is installed in the device under control 30. Note that the first reception unit 21 and the transmission unit 23 may share the same antenna in common, and therefore, may be implemented as the same communications interface.

The processing unit 24 may be implemented as a computer system including one or more processors (microprocessors) and one or more memories. That is to say, the computer system performs the function of the processing unit 24 by making the one or more processors execute one or more programs (applications) stored in the one or more memories. In this embodiment, the program(s) is/are stored in advance in the one or more memories of the processing unit 12. However, this is only an example and should not be construed as limiting. The program(s) may also be downloaded via a telecommunications line such as the Internet or distributed after having been stored in a non-transitory storage medium such as a memory card.

The processing unit 24 includes a decision unit 241 and an authentication unit 242 as shown in FIG. 1. Note that in FIG. 1, the decision unit 241 and the authentication unit 242 actually do not have a substantive physical configuration but both represent respective functions to be performed by the processing unit 24.

The decision unit 241 performs processing of associating the identification information of the mobile device 40 with its location. Specifically, when the first reception unit 21 receives the first RF signal W10, the decision unit 241 makes the transmission unit 23 transmit the third RF signal. The third RF signal is an RF signal requesting (the mobile device 40) to transmit the second RF signal W20. The third RF signal may be broadcast or multi-cast but is suitably transmitted to the mobile device 40, of which the identification information is included in the first RF signal W10. This allows the mobile device 40 to start transmitting the second RF signal W20. That is to say, this makes the gate pass management system 10 ready to detect the mobile device 40 within the second reception range D20.

In addition, the decision unit 241 starts counting a predetermined period of time at the timing when the first reception unit 21 receives the first RF signal W10. Note that the predetermined period of time does not have to start to be counted exactly at the timing when the first reception unit 21 receives the first RF signal W10 but may be slightly shifted from the timing. Alternatively, the predetermined period of time may also start to be counted at the timing when the third RF signal is transmitted from the transmission unit 23. In addition, the predetermined period of time may be set appropriately in view of the time when the person P10 arrives at the second reception range D20 from the first reception range D10.

The decision unit 241 decides, if the second reception unit 22 receives the second RF signal W20 within a predetermined period of time since the first reception unit 21 has received the first RF signal W10, that the mobile device 40, of which the identification information is included in the first RF signal, be currently located within the second reception range D20. Conversely, if the second reception unit 22 still does not receive the second RF signal W20 even when a predetermined period of time passes since the first reception unit 21 has received the first RF signal W10, the decision unit 241 decides that the mobile device 40, of which the identification information is included in the first RF signal, not have entered the second reception range D20.

As can be seen, if the second reception unit 22 receives the second RF signal W20 after the first reception unit 21 has received the first RF signal W10, then the decision unit 241 decides that the mobile device 40, of which the identification information is included in the first RF signal W10, be currently located within the second reception range D20. In this embodiment, two second reception units 22 are provided. Thus, the decision unit 241 determines whether any of the plurality of second reception units 22 has received the second RF signal W20 after the first reception unit 21 has received the first RF signal W10. The decision unit 241 decides that the mobile device 40, of which the identification information is included in the first RF signal W10, be currently located within the second reception range D20 of the second reception unit 22 that has received the second RF signal W20.

The authentication unit 242 determines whether or not to permit the person P10 carrying the mobile device 40 with him or her to enter the predetermined area R10. If the decision unit 241 decides that the mobile device 40, of which the identification information is included in the first RF signal W10, be currently located in the second reception range D20, then the authentication unit 242 performs authentication processing. The authentication processing is processing of determining whether or not the identification information included in the second RF signal W20 is included in a list of identification information. If the answer is YES (i.e., if the identification information included in the second RF signal W20 is included in the list of identification information), then the result of the authentication processing is a success. On the other hand, if the answer is NO (i.e., unless the identification information included in the second RF signal W20 is included in the list of identification information), then the result of the authentication processing is a failure. In this embodiment, the list of the identification information is a list of the identification information of mobile devices 40 representing persons who are permitted to enter the predetermined area R10. The list of the identification information is prepared in advance. Note that the list of the identification information may be stored in the gate pass management system 10 but may also be stored in an external server.

In this embodiment, at a point in time when the first reception unit 21 receives the first RF signal W10, the authentication unit 242 perform extraction processing. The extraction processing is processing of editing a list of persons to authenticate for use in the authentication processing. Specifically, when performing the extraction processing, the authentication unit 242 determines whether or not the identification information included in the first RF signal W10 that has been received at the first reception unit 21 is included in the list of the identification information. If the answer is YES (i.e., if the identification information included in the first RF signal W10 that has been received at the first reception unit 21 is included in the list of the identification information), then the authentication unit 242 adds the identification information included in the first RF signal W10 to the list of persons to authenticate. Then, the authentication unit 242 performs the authentication processing by determining whether or not the identification information included in the second RF signal W20 is included in the list of persons to authenticate. In this case, if the answer is YES (i.e., if the identification information included in the second RF signal W20 is included in the list of persons to authenticate), then the result of the authentication processing is a success. On the other hand, if the answer is NO (i.e., unless the identification information included in the second RF signal W20 is included in the list of persons to authenticate), then the result of the authentication processing is a failure. Preparing a list of persons to authenticate in advance allows the authentication processing to be done in a shorter time. Note that after the authentication processing has been done, the identification information subjected to the authentication processing may be removed from the list of persons to authenticate.

The authentication unit 242 notifies the device under control 30 and the mobile device 40 of the result of the authentication processing (such as authentication successfully done or authentication failed). Note that the mobile device 40 does not have to be notified of the result of the authentication processing.

The device under control 30 operates in accordance with the result of the authentication processing performed by the authentication unit 242. In this embodiment, the device under control 30 determines, based on the result of the authentication processing, whether or not to open the gate 31. For example, when notified by the gate pass management system 10 that the authentication has been done successfully, the device under control 30 may allow the gate 31 to be opened. In this embodiment, the device under control 30 includes the plurality of gates 311, 312. Thus, the device under control 30 may allow the gate 31, associated with the second reception range D20 where the mobile device 40 is currently located, to be opened. On the other hand, when notified by the gate pass management system 10 that the authentication has failed, the device under control 30 does not allow the gate 31 to be opened. Optionally, the device under control 30 may provide notification based on the result of the authentication processing. When notified by the gate pass management system 10 that the authentication has been done successfully, the device under control 30 may provide acoustic and/or visual notification that the authentication has been done successfully. On the other hand, when notified by the gate pass management system 10 that the authentication has failed, the device under control 30 may provide acoustic and/or visual notification that the authentication has failed.

1.2.2 Mobile Device

Figure 3:
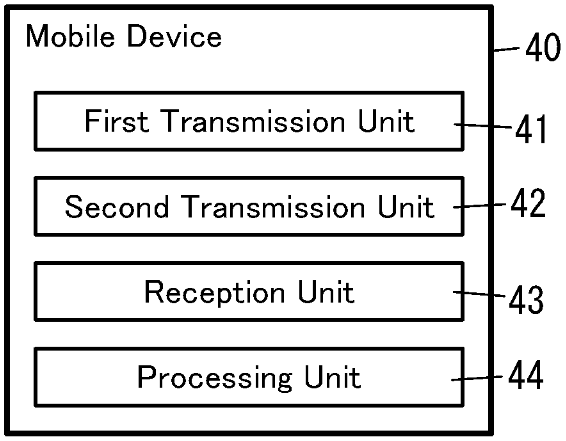
FIG. 3 is a block diagram of a mobile device according to the exemplary embodiment.

The mobile device 40 may be used to determine whether or not to permit the person P10 to enter the predetermined area R10. As shown in FIG. 3, the mobile device 40 includes a first transmission unit 41, a second transmission unit 42, a reception unit 43, and a processing unit 44. The first transmission unit 41, the second transmission unit 42, the reception unit 43, and the processing unit 44 may be housed in the same housing. The mobile device 40 has its size and weight defined for the person P10 to carry the mobile device 40 with him or her. The mobile device 40 may be implemented as a beacon, for example. However, this is only an example of the present disclosure and should not be construed as limiting. Examples of other exemplary mobile devices 40 include mobile telecommunications devices such smartphones, tablet terminals, and wearable terminals and personal computers.

The first transmission unit 41 is a device for transmitting an RF signal (first RF signal W10) which is receivable at the first reception unit 21. Since the medium to propagate the first RF signal W10 is a radio wave as described above, the first transmission unit 41 may include an antenna and a transmitter circuit. The first transmission unit 41 has the capability of transmitting an RF signal in compliance with the same communications protocol as the first reception unit 21. Such a first transmission unit 41 may transmit a radio wave including the identification information of the mobile device 40 (i.e., the first RF signal W10).

The second transmission unit 42 is a device for transmitting an RF signal (second RF signal W20) which is receivable at the second reception unit 22. The medium to propagate the second RF signal W20 is an ultrasonic wave as described above. Thus, the second transmission unit 42 may include an ultrasonic transmitter and a modulator circuit. Such a second transmission unit 42 may transmit an ultrasonic wave including the identification information of the mobile device 40 (i.e., the second RF signal W20).

The reception unit 43 is a device for receiving an RF signal. The reception unit 43 is provided to receive an RF signal (the third RF signal) from the gate pass management system 10. Since the medium to propagate the third RF signal is a radio wave in this embodiment, the reception unit 43 may include an antenna and a receiver circuit. Note that the first transmission unit 41 and the reception unit 43 may share the same antenna in common, and therefore, may be implemented as the same communications interface.

The processing unit 44 may be implemented as a computer system including one or more processors (microprocessors) and one or more memories. That is to say, the computer system performs the function of the processing unit 44 by making the one or more processors execute one or more programs (applications) stored in the one or more memories. In this embodiment, the program(s) is/are stored in advance in the one or more memories of the processing unit 44. However, this is only an example and should not be construed as limiting. The program(s) may also be downloaded via a telecommunications line such as the Internet or distributed after having been stored in a non-transitory storage medium such as a memory card.

The processing unit 44 has a plurality of modes including a first mode and a second mode. The first mode is a mode in which the first transmission unit 41 transmits the first RF signal W10. It can be said that the first mode is a mode selected when the mobile device 40 is currently located distant from the predetermined area R10 (i.e., a long-range mode). In this embodiment, the processing unit 44 makes, in the first mode, the first transmission unit 41 transmit the first RF signal W10 at regular intervals (e.g., at intervals of 500 ms or less). In the first mode, the processing unit 44 does not make the second transmission unit 42 transmit the second RF signal W20. The first RF signal W10 includes the identification information of the mobile device 40. When the reception unit 43 receives the third RF signal, the processing unit 44 switches its mode from the first mode to the second mode. The second mode is a mode in which the second transmission unit 42 transmits the second RF signal W20. It can be said that the second mode is a mode selected when the mobile device 40 is currently located close to the predetermined area R10 (i.e., a short-range mode). In this embodiment, the processing unit 44 makes, in the second mode, the second transmission unit 42 transmit the second RF signal W20 at regular intervals (e.g., at intervals of 500 ms or less). In this embodiment, the identification information of the mobile device 40 is also included in the second RF signal W20. When notified by the gate pass management system 10 that the authentication has been done successfully, the processing unit 44 may switch its mode from the second mode to the first mode. Optionally, when a certain period of time passes since the beginning of the second mode, the processing unit 44 may automatically switch to the first mode again.

1.3 Operation 1.3.1 Gate Pass Management System

Figure 4:
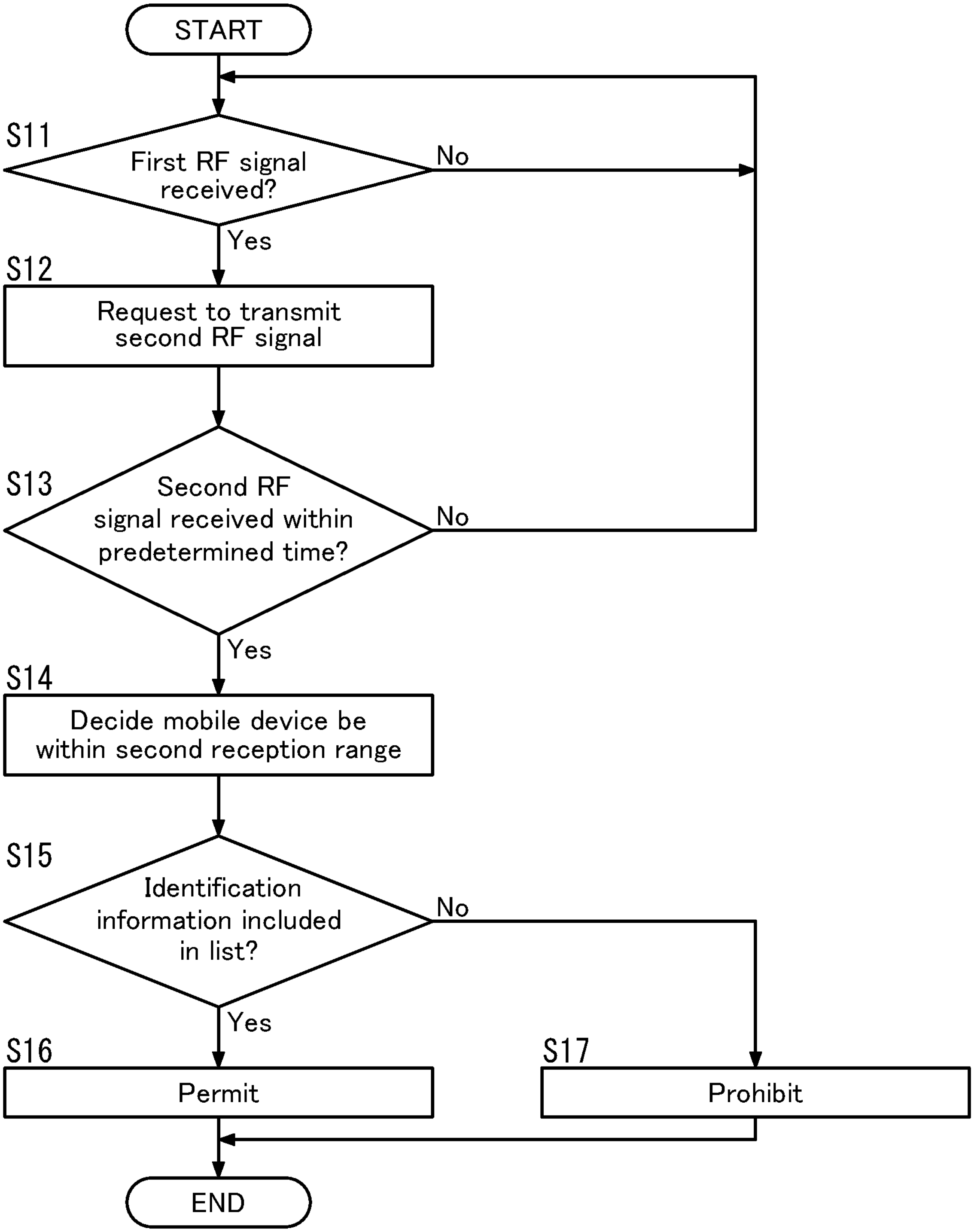
FIG. 4 is a flowchart showing an exemplary procedure of operation of the gate pass management system.

First, it will be described with reference to FIG. 4 how the gate pass management system 10 operates. The control system 20 of the gate pass management system 10 waits for the first RF signal W10 to come from the mobile device 40 (in S11). When the first reception unit 21 receives the first RF signal W10 (if the answer is YES in S11), the decision unit 241 makes the transmission unit 23 transmit the third RF signal (sends a request to transmit the second RF signal W20) (in S12) and waits for the second RF signal W20 to come from the mobile device 40 (in S13). If the second reception unit 22 receives the second RF signal W20 within a predetermined period of time since the first RF signal W10 has been received (if the answer is YES in Step S12), then the decision unit 241 decides that the mobile device 40, of which the identification information is included in the first RF signal W10, be currently located within the second reception range D20 (in S14). Then, the authentication unit 242 starts the authentication processing to determine whether or not the identification information included in the second RF signal W20 is included in the list of the identification information (i.e., the list of persons to authenticate) (in S15). If the identification information included in the second RF signal W20 is included in the list of the identification information (if the answer is YES in S15), then the authentication unit 242 sends a notification that the authentication has been done successfully and the device under control 30 permits the mobile device 40 to enter the predetermined area R10 (in S16). On the other hand, unless the identification information included in the second RF signal W20 is included in the list of the identification information (if the answer is NO in S15), then the authentication unit 242 sends a notification that the authentication has failed and the device under control 30 prohibits the mobile device 40 from entering the predetermined area R10 (in S17).

1.3.2 Mobile Device

Figure 5:
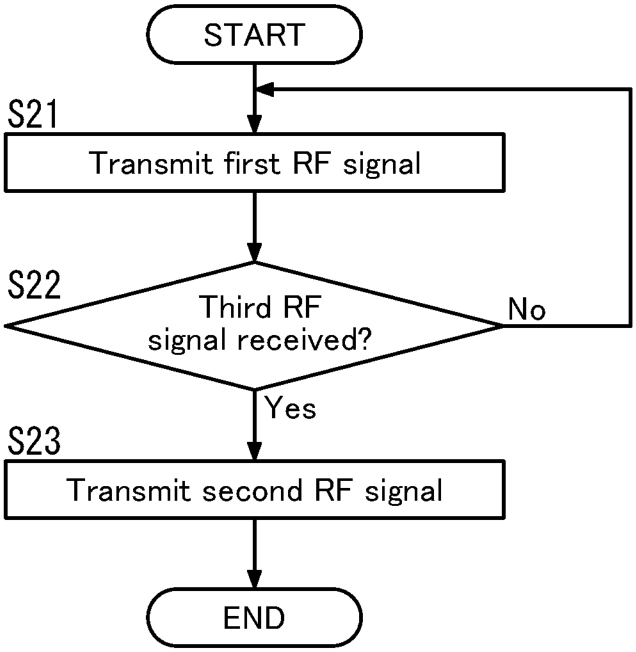
FIG. 5 is a flowchart showing an exemplary procedure of operation of the mobile device.

Next, it will be described with reference to FIG. 5 how the mobile device 40 operates. In the mobile device 40, the processing unit 44 initially operates in the first mode to make the first transmission unit 41 transmit the first RF signal W10 at regular intervals. After making the first transmission unit 41 transmit the first RF signal W10 (in S21), the processing unit 44 waits for a third RF signal to come from the gate pass management system 10 (in S22). When the reception unit 43 receives the third RF signal from the gate pass management system 10 (if the answer is YES in S22), the processing unit 44 switches from the first mode to the second mode and makes the second transmission unit 42 transmit the second RF signal W20 at regular intervals (in S23).

1.3.3 Overall System

Figure 6:
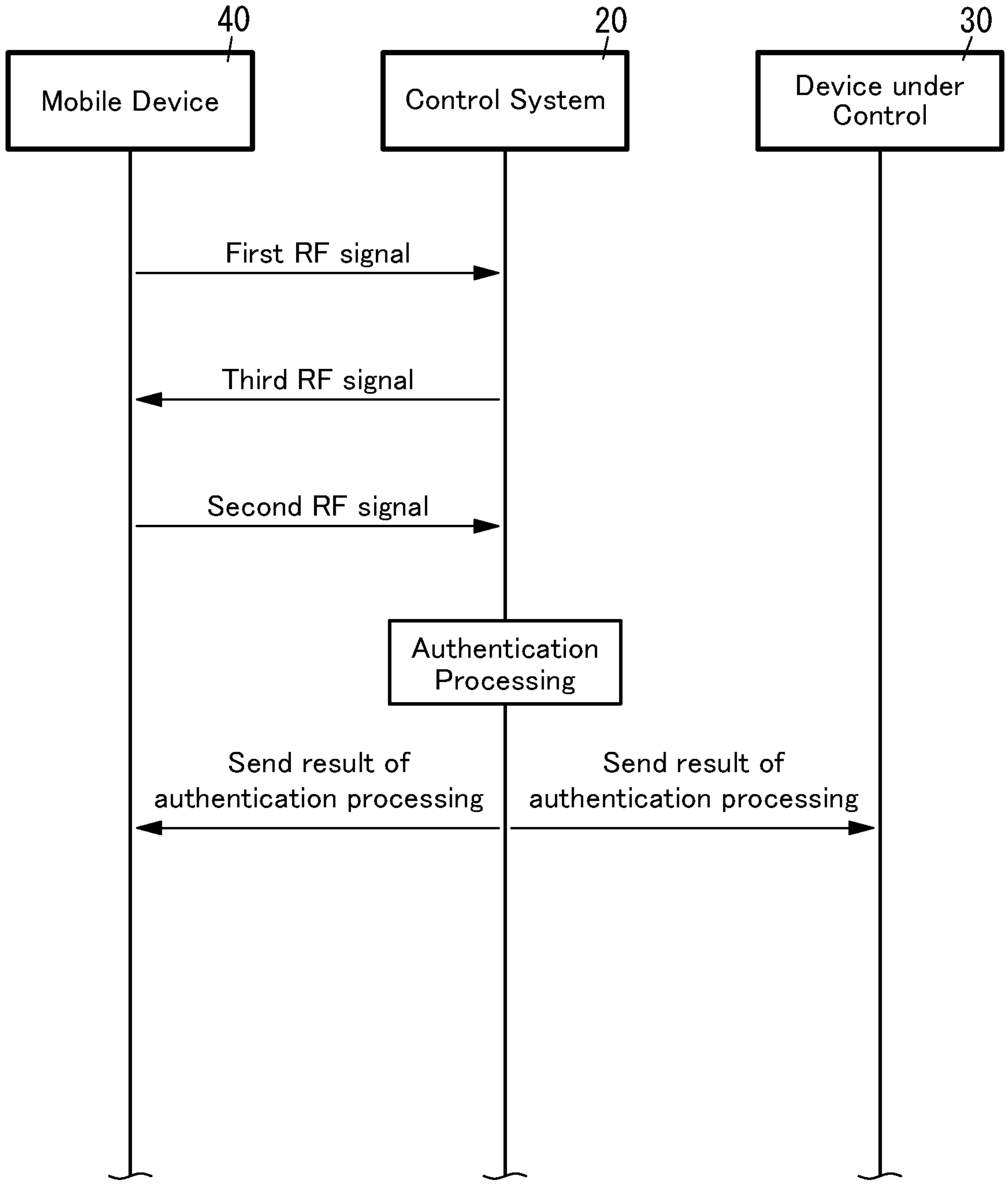
FIG. 6 is a sequence chart showing a sequence of operations of the gate pass management system and mobile device.

Next, it will be further described with reference to FIGS. 2 and 6 how the overall system including the gate pass management system 10 and the mobile device 40 operates. In the following example, suppose a situation where a person P10 who is carrying the mobile device 40 with him or her is heading from outside of the first reception range D10 toward the predetermined area R10.

While the person P10 is outside of the first reception range D10 (see FIG. 2), the mobile device 40 carried by the person P10 with him or her transmits the first RF signal W10 at regular intervals but the control system 20 of the gate pass management system 10 cannot receive the first RF signal W10 at the first reception unit 21. When the person P10 enters the first reception range D10 (see FIG. 2), the control system 20 receives, at the first reception unit 21, the first RF signal W10 from the mobile device 40 and transmits a third RF signal toward the mobile device 40 that has transmitted the first RF signal W10 received (see FIG. 6). In response to the third RF signal received, the mobile device 40 starts transmitting the second RF signal W20 (see FIG. 6). Thereafter, when the person P10 enters the second reception range D20 (see FIG. 2), the gate pass management system 10 receives, at the second reception unit 22, the second RF signal W20 from the mobile device 40. Thus, the control system 20 decides that the mobile device 40, of which the identification information is included in the first RF signal W10, be currently located within the second reception range D20 and starts authentication processing. Then, the control system 20 notifies the device under control 30 and the mobile device 40 of the result of the authentication processing (see FIG. 6). In FIG. 2, the persons P10 who have been authenticated successfully are encircled.

1.4 Resume

As can be seen from the foregoing description, the gate pass management system 10 includes a first reception unit 21, a second reception unit 22, and a decision unit 241 as shown in FIG. 1. The first reception unit 21 has a first reception range D10 and receives a first RF signal W10 including identification information of a mobile device 40. The second reception unit 22 has a second reception range D20 and receives a second RF signal W20. The second reception range D20 is defined to be a range located closer to a predetermined area R10 than the first reception range D10 is. The decision unit 241 decides, when the second reception unit 22 receives the second RF signal W20 after the first reception unit 21 has received the first RF signal W10, that the mobile device 40, of which the identification information is included in the first RF signal W10, be currently located within the second reception range D20. Such a gate pass management system 10 allows a mobile device 40 that is going to access the predetermined area R10 to be identified easily.

In other words, it can be said that the gate pass management system 10 performs the following method (gate pass management method). The gate pass management method includes receiving, at a first reception unit 21 having a first reception range D10, a first RF signal W10 including identification information of a mobile device 40. The gate pass management method further includes receiving a second RF signal W20 at a second reception unit 22 having a second reception range D20. The second reception range D20 is defined to be a range located closer to a predetermined area R10 than the first reception range D10 is. The gate pass management method further includes deciding, when the second reception unit 22 receives the second RF signal W20 after the first reception unit 21 has received the first RF signal W10, that the mobile device 40, of which the identification information is included in the first RF signal W10, be currently located within the second reception range D20. Such a gate pass management method, as well as the gate pass management system 10, allows a mobile device 40 that is going to access the predetermined area R10 to be identified easily.

The gate pass management system 10 is implemented as one or more processors. That is to say, the functions of the gate pass management system 10 are performed by making one or more processors execute a program (gate pass management program). The program is designed to make the one or more processors perform the gate pass management method. Such a program, as well as the gate pass management method, allows a mobile device 40 that is going to access the predetermined area R10 to be identified easily.

Furthermore, the mobile device 40 includes a first transmission unit 41 and a second transmission unit 42 as shown in FIG. 3. The first transmission unit 41 transmits a first RF signal W10. The first RF signal W10 is receivable at a first reception unit 21 having a first reception range D10 and includes identification information of a mobile device 40. The second transmission unit 42 transmits a second RF signal W20 after the first RF signal W10 has been received at the first reception unit 21. The second RF signal W20 is receivable at the second reception unit 22. The second reception unit 22 has a second reception range D20 which is defined to be a range located closer to a predetermined area R10 than the first reception range D10 is. This configuration allows a mobile device 40 that is going to access the predetermined area R10 to be identified easily.

In other words, it can be said that the mobile device 40 performs the following method (gate pass notification method). The gate pass notification method includes transmitting a first RF signal W10 which is receivable at a first reception unit 21 having a first reception range D10 and which includes identification information of a mobile device 40. The gate pass notification method further includes transmitting a second RF signal W20 after the first RF signal W10 has been received at the first reception unit 21. The second RF signal W20 is receivable at a second reception unit 22. The second reception unit 22 has a second reception range D20 which is defined to be a range located closer to a predetermined area R10 than the first reception range D10 is. Such a gate pass notification method allows a mobile device 40 that is going to access the predetermined area R10 to be identified easily.

The mobile device 40 is implemented as one or more processors. That is to say, the functions of the mobile device 40 are performed by making one or more processors execute a program (gate pass notification program). The program is designed to make the one or more processors perform the gate pass notification method. Such a program, as well as the gate pass notification method, allows a mobile device 40 that is going to access the predetermined area R10 to be identified easily.

2. Variations

Note that the embodiment described above is only an exemplary one of various embodiments of the present disclosure and should not be construed as limiting. Rather, the exemplary embodiment described above may be readily modified in various manners depending on a design choice or any other factor without departing from the scope of the present disclosure. Next, variations of the exemplary embodiment will be enumerated one after another.

In one variation, the medium to propagate the first RF signal does not have to be a radio wave. Likewise, the medium to propagate the second RF signal does not have to be an ultrasonic wave, either. The medium to propagate the first and second RF signals may be selected from a radio wave, an infrared ray, visible light, a sound wave, and an ultrasonic wave, for example. Nevertheless, the first and second RF signals are suitably propagated through two different media.

In another variation, the number of the first reception unit 21 of the gate pass management system 10 does not have to be one but may also be two or more. Likewise, the number of the second reception units 22 of the gate pass management system 10 does not have to be two but may also be one, or three or more. Optionally, the gate pass management system 10 may include not only the first reception unit 21 and the second reception units 22 but also one or more additional reception units as well. The one or more additional reception units may have their reception range defined to be a range which is closer to the predetermined area R10 than the first reception range D10 is but is more distant from the predetermined area R10 than the second reception range D20 is. The gate pass management system 10 may request the mobile device 40, from which the first reception unit 21 has received the first RF signal W10, transmit an RF signal that may be received at the one or more additional reception units. When the one or more additional reception units receive the RF signal, the gate pass management system 10 may transmit the third RF signal. This allows the mobile devices 40 that are going to access the predetermined area R10 to be narrowed down stepwise. In this case, the medium to propagate the RF signal that may be received at the one or more additional reception units is more suitably different from the media to propagate the first RF signal W10 and the second RF signal W20.

In still another variation, the gate pass management system 10 (decision unit 241) may keep the second reception unit 22 inactive until the first RF signal W10 is received. Alternatively, the gate pass management system 10 (decision unit 241) may make the second RF signal W20 receivable more easily by increasing the reception sensitivity of the second reception unit 22 once the first RF signal W10 has been received, for example.

In yet another variation, the gate pass management system 10 (decision unit 241) may have the transmission unit 23 transmit a polling signal at regular intervals. In that case, the mobile device 40 (processing unit 44) may transmit the first RF signal W10 in response to the polling signal received from the transmission unit 23. That is to say, the mobile device 40 (processing unit 44) does not have to transmit the first RF signal W10 spontaneously.

In yet another variation, the gate pass management system 10 (decision unit 241) may ignore the first RF signal W10 from the mobile device 40, to which the third RF signal has been transmitted, for a predetermined period of time since the third RF signal has been transmitted. When receiving the first RF signal W10 after the predetermined period of time has passed, the decision unit 241 may transmit the third RF signal again.

In yet another variation, the processing unit 44 of the mobile device 40 may stop transmitting the first RF signal W10, lengthen the transmission interval of the first RF signal W10, or decrease the strength of the first RF signal in the second mode. This is because in the second mode, there is less need to transmit the first RF signal W10.

In yet another variation, the authentication unit 242 does not have to perform the extraction processing.

In yet another variation, the list of the identification information does not have to be the list of the identification information of the mobile devices 40 corresponding to the persons who should be permitted to enter the predetermined area R10 but may also be a list of the identification information of the mobile devices 40 corresponding to the persons who should be prohibited from entering the predetermined area R10. This allows the entry, into the predetermined area R10 of persons P10 who are carrying the mobile devices 40, of which the identification information is included in the list of the identification information, to be restricted.

In yet another variation, the gate pass management system 10 does not have to include the device under control 30. In that case, the gate pass management system 10 may be called an "authentication system." Furthermore, the gate pass management system 10 does not have to include the authentication unit 242. In that case, the gate pass management system 10 may be called a "positioning system."

In yet another variation, the gate pass management system 10 (control system 20) may be implemented as a plurality of computers. For example, the respective functions (in particular, those of the decision unit 241 and the authentication unit 242) of the gate pass management system 10 (control system 20) may be distributed in a plurality of devices. Furthermore, at least some of the functions of the gate pass management system 10 (control system 20) may be implemented as a cloud computing system.

The agent that performs the functions of the gate pass management system 10 (control system 20) described above includes a computer system. In that case, the computer system may include, as hardware components, a processor and a memory. The functions of the gate pass management system 10 (control system 20) according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). Optionally, a field-programmable gate array (FPGA) and an application specific integrated circuit (ASIC) to be programmed after an LSI has been fabricated or a reconfigurable logic device allowing the connections or circuit sections inside of an LSI to be reconfigured may also be adopted for the same purpose. Those electronic circuits may be either integrated together on a single chip or distributed on multiple chips, whichever is appropriate. Those multiple chips may be integrated together in a single device or distributed in multiple devices without limitation.

3. Aspects

As can be seen from the foregoing description of embodiments and their variations, the present disclosure has the following aspects. In the following description, reference signs are inserted in parentheses just for the sake of clarifying correspondence in constituent elements between the following aspects of the present disclosure and the exemplary embodiment described above.

A first aspect is implemented as a gate pass management system (10). The gate pass management system (10) includes a first reception unit (21), a second reception unit (22, 221, 222), and a decision unit (241). The first reception unit (21) has a first reception range (D10) and receives a first RF signal (W10) including identification information of a mobile device (40). The second reception unit (22, 221, 222) has a second reception range (D20, D21, D22) and receives a second RF signal (W20). The second reception range (D20, D21, D22) is defined to be a range located closer to a predetermined area (R10) than the first reception range (D10) is. The decision unit (241) decides, when the second reception unit (22, 221, 222) receives the second RF signal (W20) after the first reception unit (21) has received the first RF signal (W10), that the mobile device (40), of which the identification information is included in the first RF signal (W10), be currently located within the second reception range (D20, D21, D22). This aspect allows a mobile device (40) that is going to access the predetermined area (R10) to be identified easily.

A second aspect is a specific implementation of the gate pass management system (10) according to the first aspect. In the second aspect, the decision unit (241) decides, when the second reception unit (22, 221, 222) receives the second RF signal (W20) within a predetermined period of time since the first reception unit (21) has received the first RF signal (W10), that the mobile device (40), of which the identification information is included in the first RF signal (W10), be currently located within the second reception range (D20, D21, D22). This aspect would allow a mobile device (40) that is going to access the predetermined area (R10) to be identified more accurately.

A third aspect is a specific implementation of the gate pass management system (10) according to the first or second aspect. In the third aspect, a medium to propagate the second RF signal (W20) is different from a medium to propagate the first RF signal (W10). This aspect facilitates distinguishing the first RF signal (W10) and the second RF signal (W20) from each other, which would allow a mobile device (40) that is going to access the predetermined area (R10) to be identified more accurately.

A fourth aspect is a specific implementation of the gate pass management system (10) according to the third aspect. In the fourth aspect, the medium to propagate the first RF signal (W10) is a radio wave, and the medium to propagate the second RF signal (W20) is a wireless medium other than the radio wave. This aspect further facilitates distinguishing the first RF signal (W10) and the second RF signal (W20) from each other.

A fifth aspect is a specific implementation of the gate pass management system (10) according to the fourth aspect. In the fifth aspect, the medium to propagate the first RF signal (W10) is a radio wave compatible with short-range wireless communication. This aspect would contribute to cutting down power consumption.

A sixth aspect is a specific implementation of the gate pass management system (10) according to the fourth or fifth aspect. In the sixth aspect, the medium to propagate the second RF signal (W20) is a sound wave. This aspect eliminates the need for the visitor/passenger to perform a predetermined operation (such as swiping) while holding the mobile device (40) in his or her hand, thus allowing him or her to enter the predetermined area (R10) in a handsfree manner.

A seventh aspect is a specific implementation of the gate pass management system (10) according to the sixth aspect. In the seventh aspect, the medium to propagate the second RF signal (W20) is an ultrasonic wave. This aspect would contribute to reducing noise significantly.

An eighth aspect is a specific implementation of the gate pass management system (10) according to any one of the first to seventh aspects. In the eighth aspect, the gate pass management system (10) further includes an authentication unit (242). The second RF signal (W20) includes the identification information of the mobile device (40). The authentication unit (242) performs authentication processing when the decision unit (241) decides that the mobile device (40), of which the identification information is included in the first RF signal (W10), be currently located within the second reception range (D20, D21, D22). The authentication processing includes determining whether or not the identification information included in the second RF signal (W20) is included in a list of identification information. This aspect allows the person's (P10) entry into the predetermined area (R10) to be managed using the mobile device (40).

A ninth aspect is a specific implementation of the gate pass management system (10) according to the eighth aspect. In the ninth aspect, the authentication unit (242) places, when the identification information included in the first RF signal (W10) received at the first reception unit (21) is included in the list of the identification information, the identification information included in the first RF signal (W10) on a list of persons to authenticate. The authentication unit (242) determines, during the authentication processing, whether or not the identification information included in the second RF signal (W20) is included in the list of persons to authenticate. This aspect allows the authentication processing to be done in a shorter time.

A tenth aspect is a specific implementation of the gate pass management system (10) according to the eighth or ninth aspect. In the tenth aspect, the gate pass management system (10) further includes a device under control (30) provided for the predetermined area (R10). The device under control (30) operates based on a result of the authentication processing performed by the authentication unit (242). This aspect would make the gate pass management system (10) even more useful through control of the device under control (30) based on the result of the authentication processing.

An eleventh aspect is a specific implementation of the gate pass management system (10) according to any one of the first to tenth aspects. In the eleventh aspect, the gate pass management system (10) further includes a transmission unit (23), of which a transmission range is broader than the second reception range (D20, D21, D22). The decision unit (241) makes, when the first reception unit (21) receives the first RF signal (W10), the transmission unit (23) transmit a third RF signal requesting transmission of the second RF signal (W20). This aspect would allow a mobile device (40) that is going to access the predetermined area (R10) to be identified more accurately.

A twelfth aspect is implemented as a gate pass management method. The gate pass management method includes receiving, at a first reception unit (21) having a first reception range (D10), a first RF signal (W10) including identification information of a mobile device (40). The gate pass management method further includes receiving a second RF signal (W20) at a second reception unit (22, 221, 222) having a second reception range (D20, D21, D22). The second reception range (D20, D21, D22) is defined to be a range located closer to a predetermined area (R10) than the first reception range (D10) is. The gate pass management method further includes deciding, when the second reception unit (22, 221, 222) receives the second RF signal (W20) after the first reception unit (21) has received the first RF signal (W10), that the mobile device (40), of which the identification information is included in the first RF signal (W10), be currently located within the second reception range (D20, D21, D22). This aspect allows a mobile device (40) that is going to access the predetermined area (R10) to be identified easily.

A thirteenth aspect is implemented as a mobile device (40). The mobile device (40) includes a first transmission unit (41) and a second transmission unit (42). The first transmission unit (41) transmits a first RF signal (W10). The first RF signal (W10) is receivable at a first reception unit (21) having a first reception range (D10) and includes identification information of a mobile device (40). The second transmission unit (42) transmits a second RF signal (W20) after the first RF signal (W10) has been received at the first reception unit (21). The second RF signal (W20) is receivable at the second reception unit (22, 221, 222). The second reception unit (22, 221, 222) has a second reception range (D20, D21, D22) which is defined to be a range located closer to a predetermined area (R10) than the first reception range (D10) is. This aspect allows a mobile device (40) that is going to access the predetermined area (R10) to be identified easily.

A fourteenth aspect is implemented as a gate pass notification method. The gate pass notification method includes transmitting a first RF signal (W10) which is receivable at a first reception unit (21) having a first reception range (D10) and which includes identification information of a mobile device (40). The gate pass notification method further includes transmitting a second RF signal (W20) after the first RF signal (W10) has been received at the first reception unit (21). The second RF signal (W20) is receivable at a second reception unit (22, 221, 222). The second reception unit (22, 221, 222) has a second reception range (D20, D21, D22) which is defined to be a range located closer to a predetermined area (R10) than the first reception range (D10) is. This aspect allows a mobile device (40) that is going to access the predetermined area (R10) to be identified easily.

A fifteen aspect is implemented as a program which is designed to cause one or more processors to perform either the gate pass management method of the twelfth aspect or the gate pass notification method of the fourteenth aspect. This aspect allows a mobile device (40) that is going to access the predetermined area (R10) to be identified easily.

REFERENCE SIGNS LIST

10 Gate Pass Management System
21 First Reception Unit
22, 221, 222 Second Reception Unit
23 Transmission Unit
241 Decision Unit
242 Authentication Unit
30 Device under Control
40 Mobile Device
41 First Transmission Unit
42 Second Transmission Unit
D10 First Reception Range
D20, D21, D22 Second Reception Range
R10 Predetermined Area
W10 First RF Signal
W20 Second RF Signal

The invention claimed is:

1. A gate pass management system comprising:

a first reception unit having a first reception range and configured to receive a first RF signal including identification information of a mobile device;

a second reception unit having a second reception range and configured to receive a second RF signal, the second reception range being defined to be a range located closer to a predetermined area than the first reception range is; and a decision unit configured to decide, when the second reception unit receives the second RF signal after the first reception unit has received the first RF signal, that the mobile device, of which the identification information is included in the first RF signal, be currently located within the second reception range, a medium to propagate the second RF signal being different from a medium to propagate the first RF signal, wherein the medium to propagate the first RF signal is a radio wave, and the medium to propagate the second RF signal is an ultrasonic wave.

2. The gate pass management system of claim 1, wherein the decision unit is configured to decide, when the second reception unit receives the second RF signal within a predetermined period of time since the first reception unit has received the first RF signal, that the mobile device, of which the identification information is included in the first RF signal, be currently located within the second reception range.

3. The gate pass management system of claim 1, wherein the medium to propagate the first RF signal is a radio wave compatible with short-range wireless communication.

4. The gate pass management system of claim 1, further comprising an authentication unit, wherein the second RF signal includes the identification information of the mobile device, the authentication unit is configured to perform authentication processing when the decision unit decides that the mobile device, of which the identification information is included in the first RF signal, be currently located within the second reception range, and the authentication processing includes determining whether or not the identification information included in the second RF signal is included in a list of identification information.

5. The gate pass management system of claim 4, wherein the authentication unit is configured to place, when the identification information included in the first RF signal received at the first reception unit is included in the list of the identification information, the identification information included in the first RF signal on a list of persons to authenticate, and the authentication unit is configured to determine, during the authentication processing, whether or not the identification information included in the second RF signal is included in the list of persons to authenticate.

6. The gate pass management system of claim 4, further comprising a device under control provided for the predetermined area, wherein the device under control is configured to operate based on a result of the authentication processing performed by the authentication unit.

7. The gate pass management system of claim 1, further comprising a transmission unit, of which a transmission range is broader than the second reception range, wherein the decision unit is configured to make, when the first reception unit receives the first RF signal, the transmission unit transmit a third RF signal requesting transmission of the second RF signal.

8. A gate pass management method comprising:

receiving, at a first reception unit having a first reception range, a first RF signal including identification information of a mobile device;

receiving a second RF signal at a second reception unit having a second reception range, the second reception range being defined to be a range located closer to a predetermined area than the first reception range is; and deciding, when the second reception unit receives the second RF signal after the first reception unit has received the first RF signal, that the mobile device, of which the identification information is included in the first RF signal, be currently located within the second reception range, a medium to propagate the second RF signal being different from a medium to propagate the first RF signal, wherein the medium to propagate the first RF signal is a radio wave, and the medium to propagate the second RF signal is an ultrasonic wave.

9. A mobile device comprising:

a first transmission unit configured to transmit a first RF signal, the first RF signal being receivable at a first reception unit having a first reception range, the first RF signal including identification information of a mobile device; and a second transmission unit configured to transmit a second RF signal after the first RF signal has been received at the first reception unit, the second RF signal being receivable at a second reception unit having a second reception range which is defined to be a range located closer to a predetermined area than the first reception range is, a medium to propagate the second RF signal being different from a medium to propagate the first RF signal, wherein the medium to propagate the first RF signal is a radio wave, and the medium to propagate the second RF signal is an ultrasonic wave.

10. A gate pass notification method comprising:

transmitting a first RF signal, the first RF signal being receivable at a first reception unit having a first reception range, the first RF signal including identification information of a mobile device; and transmitting a second RF signal after the first RF signal has been received at the first reception unit, the second RF signal being receivable at a second reception unit having a second reception range which is defined to be a range located closer to a predetermined area than the first reception range is, a medium to propagate the second RF signal being different from a medium to propagate the first RF signal, wherein the medium to propagate the first RF signal is a radio wave, and the medium to propagate the second RF signal is an ultrasonic wave.

11. A non-transitory storage medium storing a program that is designed to cause one or more processors to perform a gate pass management method, the gate pass management method comprising:

receiving, at a first reception unit having a first reception range, a first RF signal including identification information of a mobile device;

receiving a second RF signal at a second reception unit having a second reception range, the second reception range being defined to be a range located closer to a predetermined area than the first reception range is; and deciding, when the second reception unit receives the second RF signal after the first reception unit has received the first RF signal, that the mobile device, of which the identification information is included in the first RF signal, be currently located within the second reception range, a medium to propagate the second RF signal being different from a medium to propagate the first RF signal, wherein the medium to propagate the first RF signal is a radio wave, and the medium to propagate the second RF signal is an ultrasonic wave.

12. A non-transitory storage medium storing a program that is designed to cause one or more processors to perform a gate pass notification method, the gate pass notification method comprising:

transmitting a first RF signal, the first RF signal being receivable at a first reception unit having a first reception range, the first RF signal including identification information of a mobile device; and transmitting a second RF signal after the first RF signal has been received at the first reception unit, the second RF signal being receivable at a second reception unit having a second reception range which is defined to be a range located closer to a predetermined area than the first reception range is, a medium to propagate the second RF signal being different from a medium to propagate the first RF signal, wherein the medium to propagate the first RF signal is a radio wave, and the medium to propagate the second RF signal is an ultrasonic wave.

* * * * *